United States Patent
Yuang et al.

(10) Patent No.: US 7,379,438 B2
(45) Date of Patent: May 27, 2008

(54) SYSTEM AND METHOD FOR CONTENTION CONTROL IN WIRELESS NETWORK

(75) Inventors: Maria Chi-Jui Yuang, Hsinchu (TW); Shih-Hsuan Lin, Wuri Township, Taichung County (TW); Bird Chih-Peng Lo, Zhubei (TW)

(73) Assignee: Institute for Information Industry, Taipei (TW)

( * ) Notice: Subject to any disclaimer, the term of this patent is extended or adjusted under 35 U.S.C. 154(b) by 490 days.

(21) Appl. No.: 10/937,217

(22) Filed: Sep. 9, 2004

(65) Prior Publication Data

US 2005/0141449 A1 Jun. 30, 2005

(30) Foreign Application Priority Data

Dec. 25, 2003 (TW) .............................. 92136812 A

(51) Int. Cl.
 *H04Q 7/00* (2006.01)
 *H04Q 7/24* (2006.01)
(52) U.S. Cl. ........................ 370/329; 370/338
(58) Field of Classification Search ................ 370/329, 370/338
 See application file for complete search history.

(56) References Cited

U.S. PATENT DOCUMENTS

| 7,068,633 | B1 * | 6/2006 | Ho ............................. 370/338 |
| 2003/0161340 | A1 * | 8/2003 | Sherman ..................... 370/445 |
| 2004/0013134 | A1 * | 1/2004 | Hautala ...................... 370/476 |

* cited by examiner

*Primary Examiner*—William Trost
*Assistant Examiner*—Marivelisse Santiago-Cordero
(74) *Attorney, Agent, or Firm*—Thomas, Kayden, Horstemeyer & Risley

(57) ABSTRACT

A Quality-of-Service-enabled access point (QAP) broadcasts an initial number of time slots and an upper limit to a Quality-of-Service-enabled station (QSTA). The QSTA generates a random number between 0 and 1. The QSTA selects a time slot from the initial number of time slots for data transmission contention and issues a TXOP reservation request to the QAP in the time slot if the random number is lower than the upper limit. The QAP generates a reservation result. The QAP broadcasts the reservation result to the QSTA if more than one QSTA issued reservation requests in the same time slot. The QSTA selects a new time slot for data transmission contention and issues a new TXOP reservation request to the QAP in the new time slot if the previous reservation is not successful according to the reservation result.

11 Claims, 6 Drawing Sheets

SYSTEM AND METHOD FOR CONTENTION CONTROL IN WIRELESS NETWORK

BACKGROUND OF THE INVENTION

1. Field of the Invention

The present invention relates to wireless data communication technology; and particularly to a system and method for contention control in wireless network.

2. Description of the Related Art

To support wireless local area network (WLAN) applications with Quality of Service (QoS) requirements, the IEEE 802.11e supplement has been introduced. The 802.11e includes an additional channel access method called hybrid coordination function (HCF), which is usable in Quality of Service (QoS) network configuration. HCF is upwardly compatible with distributed coordination function (DCF) and point coordination function (PCF), and at the same time provides QOS-enabled stations (QSTAs), in which Quality of Service is supported, with prioritized and parameterized QoS access to the wireless medium. HCF combines aspects of both contention-based (EDCF) and polling-based (PCF) channel access mechanism.

In PCF mode, a hybrid coordinator (HC) dominates channel access determination. The HC may be an access point (AP) or a station (if an AP is absent). The winning station in EDCF mode or the polled station in PCF mode obtains a transmission opportunity (TXOP) to transmit the packets. The HC gains control of the channel after sensing the idle channel for a time period equivalent to Point coordination function Inter-Frame Spaces (PIFS). PIFS is used by the HC to take control of the channel and start a PCF. After grabbing the channel, the HC polls a QSTA according to its polling list. The polled station may carry out several packet exchange sequences during one TXOP. At the end of a TXOP, the HC gains control of the channel again, and it either sends a QoS-Poll to the next QSTA on its polling, or releases the channel if there are no more stations to be polled.

The HC controlled contention (CC) mechanism determines which transmission time slot is occupied for a particular QSTA and allows QSTAs to request TXOPs without having to contend with EDCF traffic. These requests may be used to initiate either periodic polled TXOPs for traffic of periodic type, or one-time TXOPs to handle burst traffic. The CC is particularly useful when there is heavy loading on best effort (DCF or EDCF) traffic, which makes it difficult for QSTAs to send TXOP requests through EDCF.

FIG. 1 is a schematic diagram of conventional IEEE 802.11e contention control. To begin a CC 12, the HC sends a contention control packet, which contains such information as the number of controlled contention transmission opportunities (Nccop) and the duration of each CCOP (Dccop). A contention control interval (CCI) duration 11a is obtained by Dccop multiplied by Nccop. After PIFS, each QSTA with a TXOP request randomly selects a particular CCOP to send its reservation request (RR) packet.

SUMMARY OF THE INVENTION

The wireless network comprises a Quality-of-Service-enabled access point (QAP) and Quality-of-Service-enabled stations (QSTAs). In accordance with one embodiment, the present application discloses a contention control method in a wireless network. First, a QAP broadcasts an initial number of time slots and an upper limit to the QSTA. The QSTA generates a random number between 0 and 1. The QSTA selects a time slot from the initial collection of time slots for data transmission contention and issues a TXOP reservation request to the QAP in the time slot if the random number is lower than the upper limit. The QAP generates a reservation result comprising multiple reservation amounts in all initial time slots. The QAP broadcasts the reservation result to the QSTA. The QSTA selects a new time slot for data transmission contention and issues a new TXOP reservation request to the QAP in the new time slot if the previous reservation is not successful according to the reservation result.

In addition, the QAP determines a potential number of QSTAs according to offline analysis data, and acquires an admissible number of QSTAs and the initial number of time slots by querying a resource management database. The resource management database is generated by numerical analysis data.

Preferably, the above method is limited to the potential time period satisfying a confidence level of QoS according to historical data. The potential time period is calculated by an equation, $$\hat{T} > \mu + \frac{1}{\sqrt{1-N}} \sigma,$$

where $\hat{T}$ represents the potential time period, $\mu$ represents the average of time periods according to experiment data, $\sigma$ represents the square root of the variance of time periods according to experiment data, and N represents the confidence level.

The QAP comprises an initiation contention control module, a reservation request acquisition module, a succession contention control module and a broadcast module. The reservation request acquisition module receives multiple reservation requests during multiple initial time slots from multiple QSTAs. The succession contention control module receives information regarding the initial time slots and the reservation requests therein from the reservation request acquisition module, generates a reservation result comprising multiple reservation amounts individually corresponding to one of the initial time slots, and transmits the reservation result if more than one QSTAs issued reservation requests in the same initial time slot. The broadcast module receives an initial number of time slots and an upper limit from the initiation contention control module, receives the reservation result from the succession contention control module, and broadcasts the initial number of time slots, the upper limit and the reservation result to the QSTAs.

The initiation contention control module preferably determines a potential number of QSTAs according to historical data, acquires an admissible number of QSTAs and the initial number of time slots by querying a resource management database with the potential number of QSTAs and a potential time period, and generates the upper limit by dividing the admissible number of QSTAs into the potential number of QSTAs. Preferably, the QAP further comprises a storage device storing the resource management database.

The present invention further discloses a machine-readable storage medium in the QSTA storing a computer program which, when executed, performs a method for contention control. The process receives an initial number of time slots and an upper limit from a QAP, generates a random number between 0 and 1, selects a time slot from the initial collection of time slots for data transmission contention if the random number is lower than the upper limit, and issues a TXOP reservation request to the QAP in the time slot. In addition, the process receives a reservation result comprising multiple reservation amounts in all initial time slots, selects a new time slot for data transmission contention if the previous reservation was not successful according to the reservation result, and issues a new TXOP reservation request to the QAP in the new time slot.

The QAP is preferably an access point (AP), and the QSTA is preferably a mobile computer, a mobile handheld device, a smart phone, a wireless on-line gaming console, a wireless net TV or a wireless information appliance.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
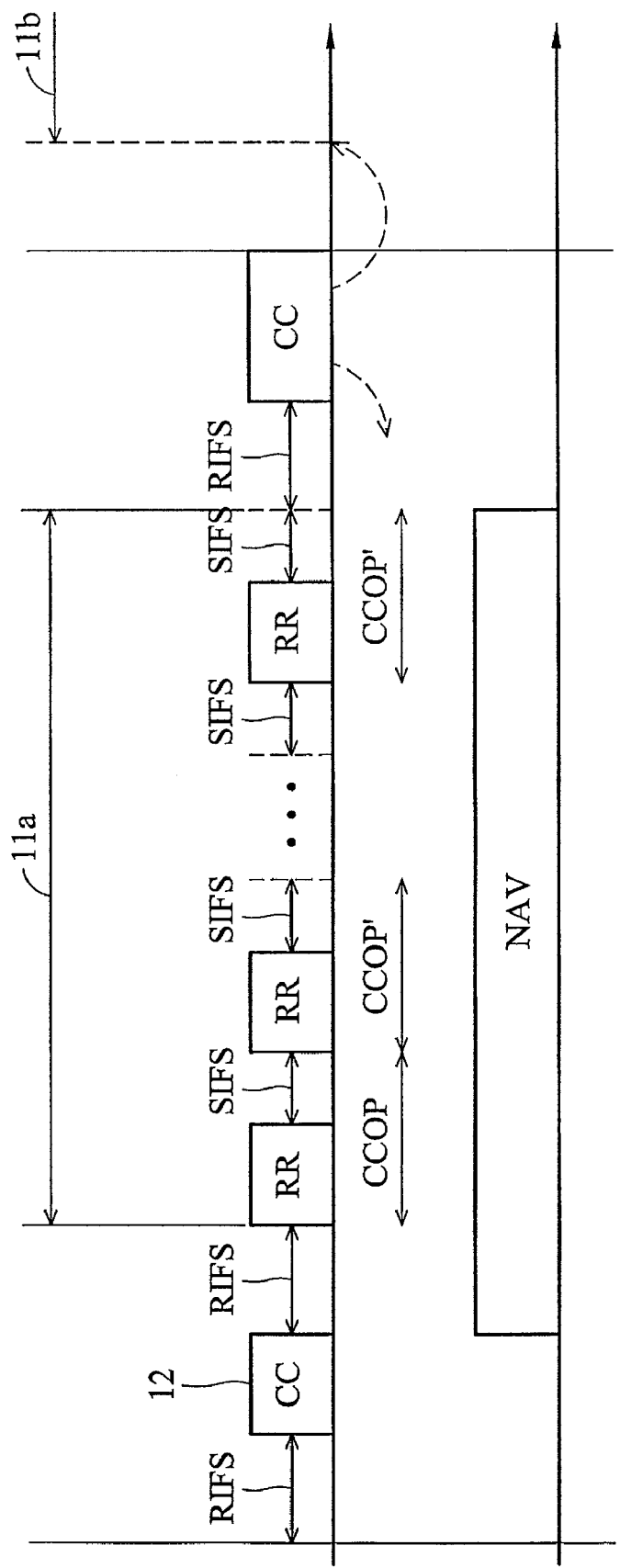
FIG. 1 is a schematic diagram of conventional IEEE 802.11e contention control.
Figure 2:
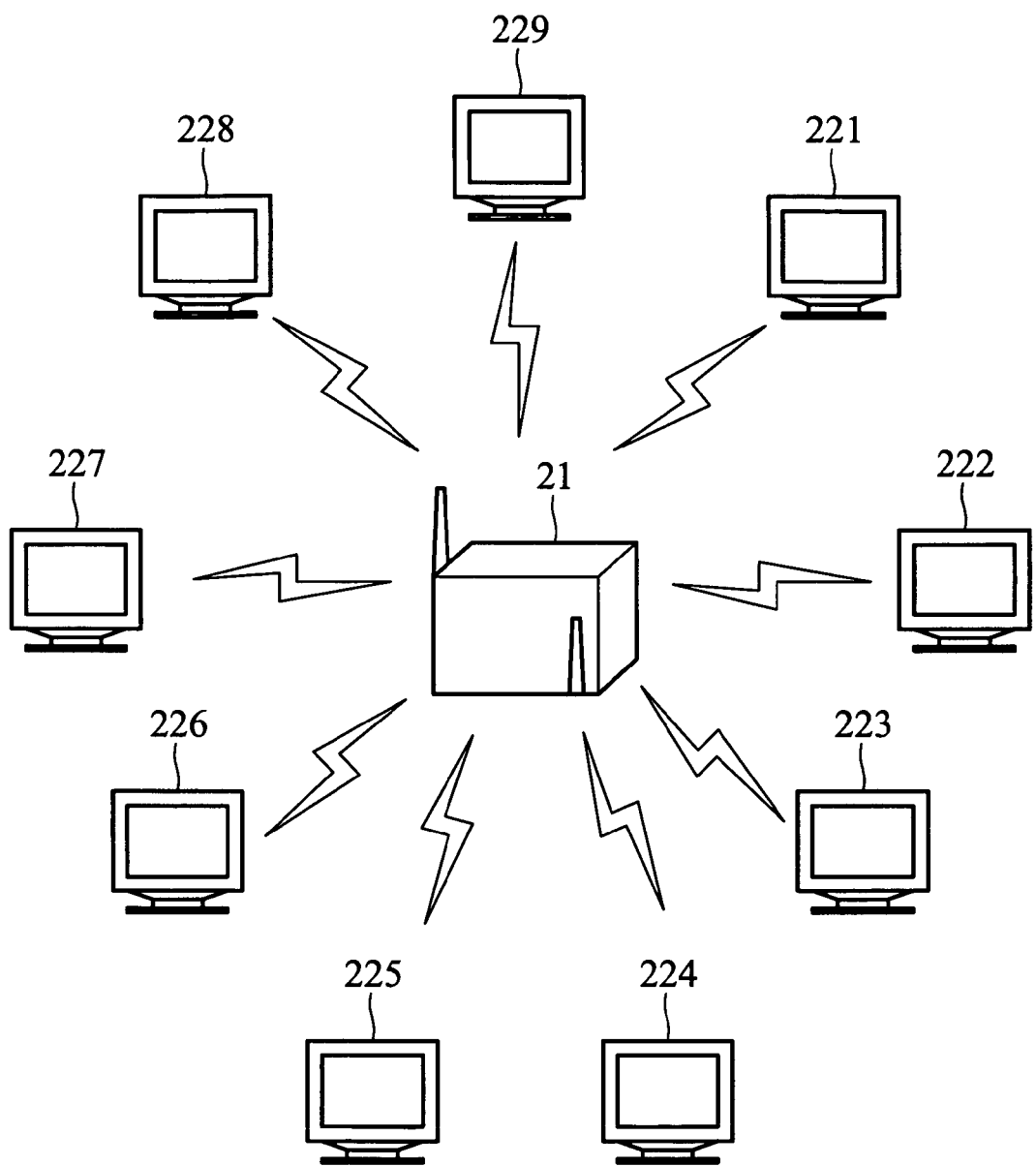
FIG. 2 is an architecture diagram of a wireless network environment according to the preferred embodiment of the invention.

A preferred embodiment of the invention discloses a contention control system and method thereof in a wireless network. FIG. 2 is an architecture diagram of a wireless network environment according to the preferred embodiment of the invention. The environment comprises a Quality-of-Service-enabled access point (QAP) 21, and nine Quality-of-Service-enabled stations (QSTAs) 221 to 229. The QAP 21 provides multiple time slots, and the QSTAs 221 to 229 contend one of them for data transmission via radio frequency (RF). In addition, the QAP 21 is responsible for coordinating contentions from the QSTAs 221 to 229 to carry out time slot allocation. The QAP 21 performs not only contention control functions but handles the radio interface to the QSTAs 221 to 229 with radio equipment, such as transceivers and antenna, and preferably operates as a conventional access point (AP). The QSTA may be a mobile computer, a mobile handheld device, a smart phone, a wireless On-Line Gaming Console, a wireless net TV, a wireless information appliance and the like.

FIGS. 3a and 3b are flowcharts showing a method of contention control according to the preferred embodiment of the invention. In order to make the preferred embodiment more easily understood, the flowchart illustrates behavior between the QAP 21 and only QSTA 221. In step S311, the QAP 21 determines a potential number of QSTAs, and a potential time period satisfying a confidence level (preferable is 99%) of QoS according to historical data. The historical data may contain one or more historical contention control logs individually including an actual number of stations issuing a transmission opportunity (TXOP) reservation request, an actual time period for entire contention control operations, or others. The potential time period limits the entire contention control operations to an acceptable duration to avoid crowding out of subsequent data transmission. Equation (1) shows the formula for calculating the potential time period satisfying a specific confidence level (preferably 99%) of QoS.

$$\hat{T} > \mu + \frac{1}{\sqrt{1-N}} \sigma, \qquad \text{Equation (1)}$$

where $\hat{T}$ represents the potential time period, $\mu$ represents the average of time periods according to experiment data, $\sigma$ is the square root of the variance of time periods according to experiment data, and N represents the confidence level. In step S312, the QAP 21 acquires an admissible number of QSTAs and an initial number of time slots for QSTAs by querying a resource management database (RMDB) with the potential number of QSTAs and the potential time period. The RMDB stores multiple resource allocation records individually representing theoretical resource allocation information for a given potential time period and a given number of QSTAs. The RMDB is generated by numerical analysis data. The theoretical resource allocation information includes an admissible number of QSTAs and an initial number of TXOPs. In step S313, the QAP 21 calculates an upper limit, preferable between 0 and 1, by dividing the admissible number of QSTAs into the potential number of QSTAs. In step S314, the QAP 21 broadcasts the initial number of time slots and the upper limit to all QSTAs.

In step S321, the QSTA 221 receives the initial number of time slots and the upper limit. It is noted that the above information is received by not only the QSTA 221 but all QSTAs 221 to 229. In step S322, the QSTA 221 generates a random number between 0 and 1. In step S323, the QSTA 221 determines whether the random number is lower than the upper limit, if so, the QSTA 221 performs step S325; otherwise the QSTA 221 performs step S324 to ignore the current contention and wait for a new contention. The determination limits the number of QSTAs issuing a TXOP reservation request near the admissible number of QSTAs. In step S325, the QSTA 221 selects a specific time slot for data transmission contention. In step S326, the QSTA 221 issues a TXOP reservation request to the QAP in the specific time slot. For example, the QSTA selects a third time slot and issues a TXOP reservation request in that time slot.

In step S331, the QAP 21 receives all TXOP reservation requests during all initial time slots. In step S332, the QAP 21 generates a reservation result comprising reservation amounts in all initial time slots. One QSTA wins a TXOP when a reservation amount in a specific time slot equals one, and alternatively, no QSTA wins a TXOP when a reservation amount in a specific time slot exceeds one. In step S333, the QAP 21 determines whether a subsequent contention control is required, if so, the QAP 21 performs step S334; otherwise, terminates the contention control. Two conditions must be satisfied for a subsequent contention control. More than one QSTA issue TXOP reservation requests in the same time slot and the subsequent contention control operation is ended within the potential time period. In step S334, the QAP 21 broadcasts the reservation result to all QSTAs. The reservation result additionally indicates the subsequent time slots for data transmission reservation, and the number of subsequent time slots equals the sum of the QSTAs failing to acquire a TXOP.

In step S341, the QSTA 221 receives the reservation result from the QAP 21. In step S342, the QSTA 221 determines whether the previous reservation is successful by checking the reservation amount of the previously reserved time slot, if so, the QSTA 221 completes the reservation; otherwise, the QSTA 221 performs step S343. Specifically, the previous reservation is determined to be successful if the reservation amount of the previously reserved time slot equals one. In step S343, the QSTA 221 selects a new time slot for data transmission contention, and subsequently issues a TXOP reservation request in the new time slot. The remaining contention control operations may be deduced by analogy.

Figure 4:
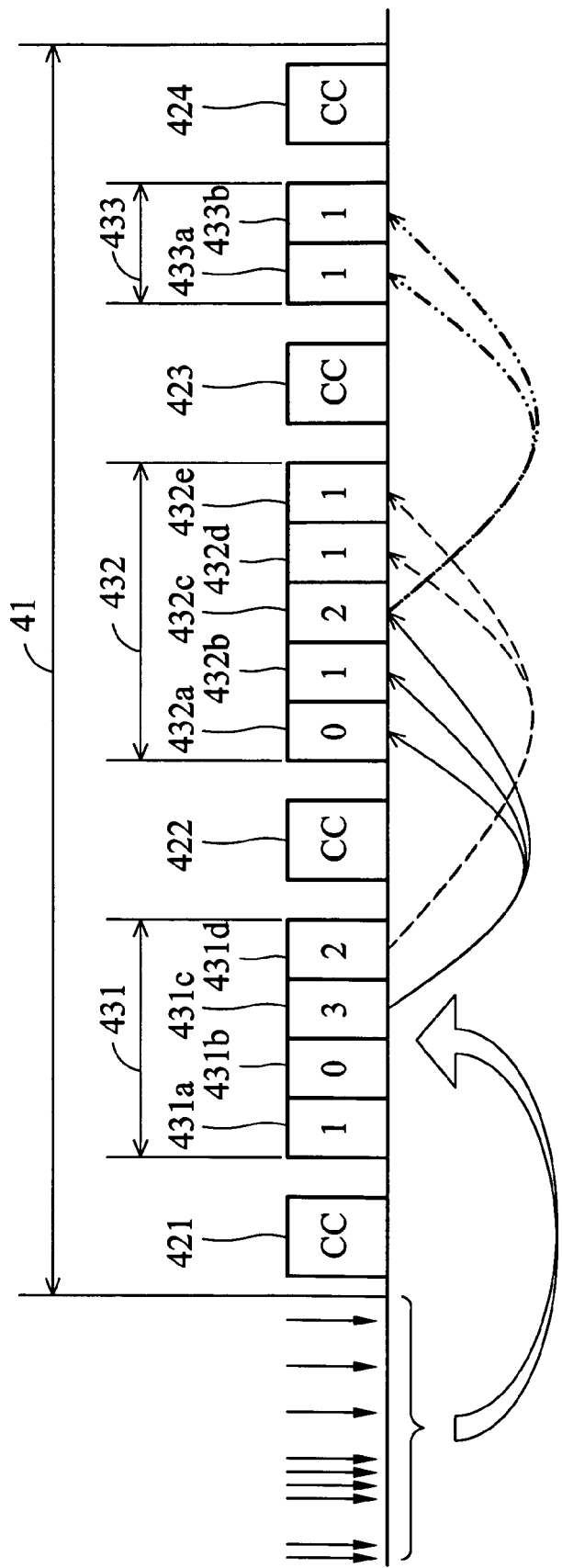
FIG. 4 is a timing diagram of an exemplary contention control process.

FIG. 4 is a timing diagram of an exemplary contention control process. In a first contention control (CC) phase 421, referring to steps S311 to S314, the QAP 21 estimates nine as a potential number of OSTAs, and acquires a potential time period 41 satisfying 99% of QoS according to historical data. Subsequently, the QAP 21 acquires six as an admissible number of QSTAs and four as an initial number of time slots for QSTAs by querying a RMDB with the potential amount of QSTAs and the potential time period. 0.667 is calculated as an upper limit by dividing the admissible number of QSTAs into the potential number of QSTAs. The QAP 21 broadcasts the initial number of time slots and the upper limit to all QSTAs 221 to 229.

In a first reservation request (RR) phase 431, referring to steps S321 to S326 and S331, six QSTAs individually generate a random number lower than the upper limit, and selects one of the time slots 431a to 431d to issue a TXOP reservation request. As a result, only one QSTA wins the TXOP as shown in the time slot 431a.

In a second CC phase 422, referring to steps S332 to S334, the QAP 21 generates a reservation result comprising a list {1,0,3,2} and broadcasts it to all QSTAs 221 to 229.

In a second RR phase 432, referring to steps S341 to S343, S325 to S326, and S331, three QSTAs previously selecting time slot 431c to issue TXOP reservation requests, individually selects one of the first three time slots, from 432a to 432c, to issue a TXOP reservation request. In addition, two QSTAs previously selecting time slot 431d to issue TXOP reservation requests, individually selects one of the last two time slots, from 432d to 432e, to issue a TXOP reservation request. As a result, three QSTAs individually win a TXOP, as shown in time slots 432b, 432d and 432e.

In a third CC phase 423, referring to steps S332 to S334, the QAP 21 generates a reservation result comprising a list {0,1,2,1,1} and broadcasts it to all QSTAs 221 to 229.

In a third RR phase 433, referring to steps S341 to S343, S325 to S326, and S331, the remaining two QSTAs previously selecting the time slot 432c to issue TXOP reservation /requests, individually select time slots 433a or 433b to issue a reservation request. As a result, both QSTAs win the TXOPs as shown in time slots 433a, 433b.

In a fourth CC phase 424, referring to steps S332 to S334, the QAP 21 completes the entire contention control operation.

Figure 5:
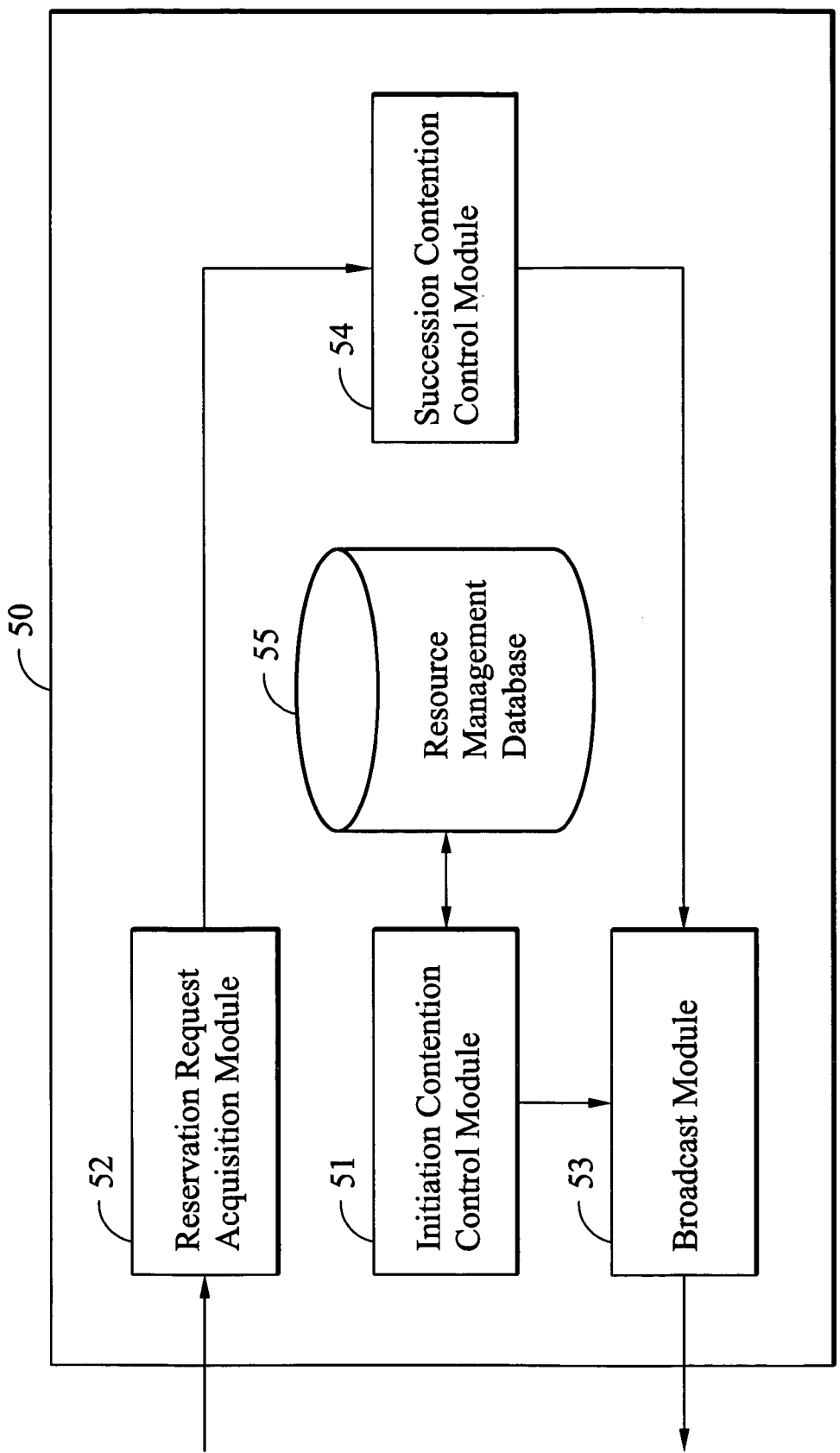
FIG. 5 is a system block diagram of contention control according to the preferred embodiment of the invention.
Figure 6:
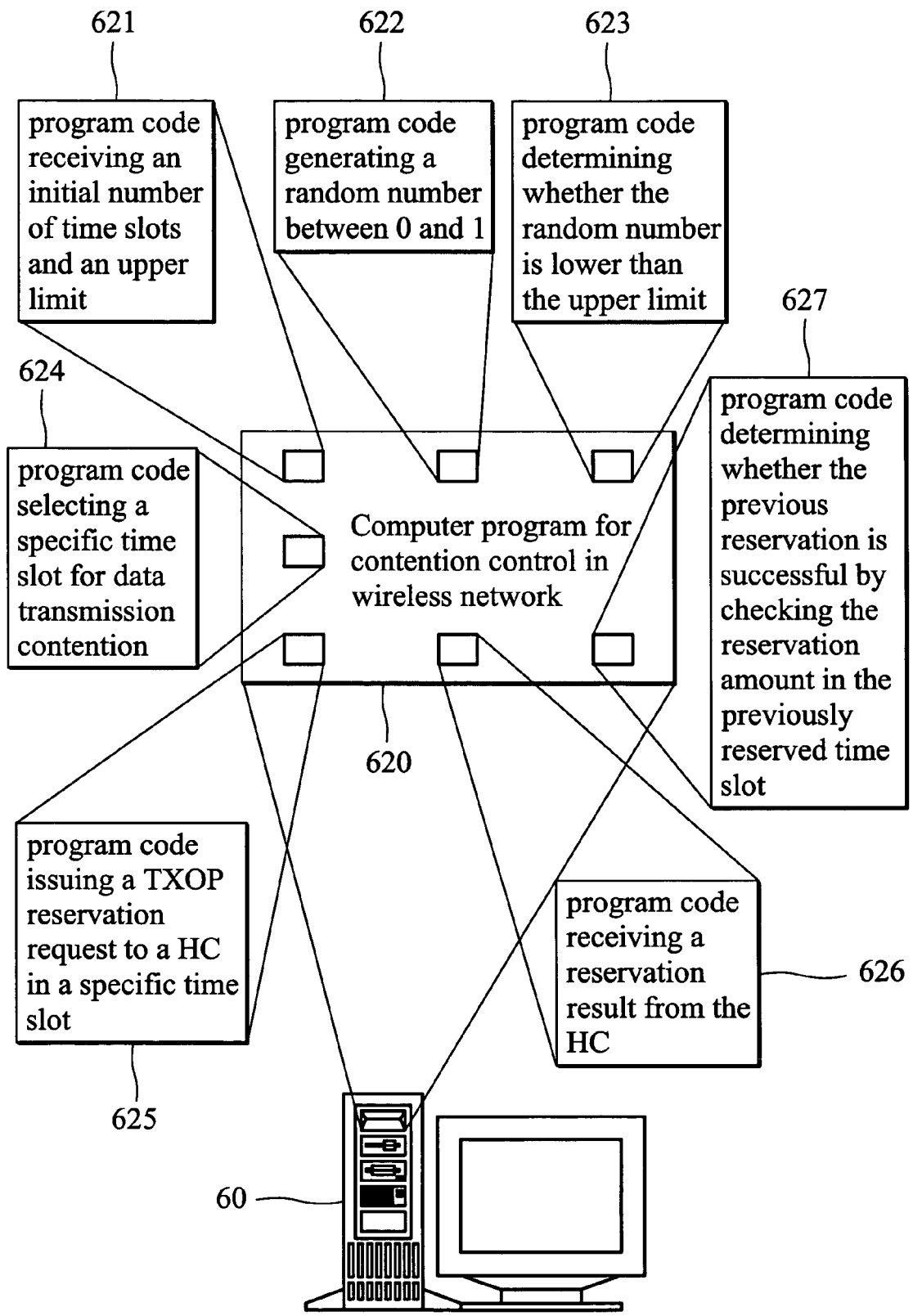
FIG. 6 is a diagram of a storage medium for a computer program providing the method of contention control in a QSTA according to the preferred embodiment of the invention.

The present invention further discloses a contention control system 50 embedded in the QAP 21. FIG. 5 is a system block diagram of contention control according to the preferred embodiment of the invention. The contention control system 50 preferably comprises an initiation contention control module 51, a reservation request acquisition module 52, a broadcast module 53, a succession contention control module 54, and a storage device 55. It is noted that the system 50 may be implemented in computer program code or electronic circuits.

The storage device 55 stores a resource management database (RMDB). The RMDB stores multiple resource allocation records individually representing theoretical resource allocation information for a given potential time period and a given number of QSTAs. The theoretical resource allocation information includes an admissible number of QSTAs and an initial number of TXOPs.

The initiation contention control module 51 determines a potential number of QSTAs, and a potential time period satisfying a confidence level (preferably 99%) of QoS according to experiment data. The potential time period limits the overall contention control operations to an acceptable duration to avoid crowding out subsequent data transmission and is determined by equation (1). The initiation contention control module 51 acquires an admissible number of QSTAs and an initial number of time slots for QSTAs by querying the RMDB with the potential number of QSTAs and the potential time period. The initiation contention control module 51 calculates an upper limit by dividing the admissible number of QSTAs into the potential number of QSTAs. The initiation contention control module 51 transmits the initial number of TXOPs and the upper limit to the broadcast module 52.

The reservation request acquisition module 52 receives multiple reservation requests in various time slots from the QSTAs 221 to 229, and transmits them to the succession contention control module 54.

The succession contention control module 54 receives information regarding the initial time slots and the reservation requests therein from the reservation request acquisition module 52, and accordingly generates a reservation result comprising reservation amounts in all initial time slots. The succession contention control module 54 determines whether a subsequent contention control is required. Two conditions must be satisfied for a subsequent contention control. More than one QSTA issuing TXOP reservation requests in the same time slot, and the subsequent contention control operation ends within the potential time period. The succession contention control module 54 transmits the reservation result to the broadcast module 53 if the subsequent contention control is required.

The broadcast module 53 broadcasts the initial amount of TXOPs, the upper limit and the reservation result to all QSTAs 221 to 229.

Figure 3:
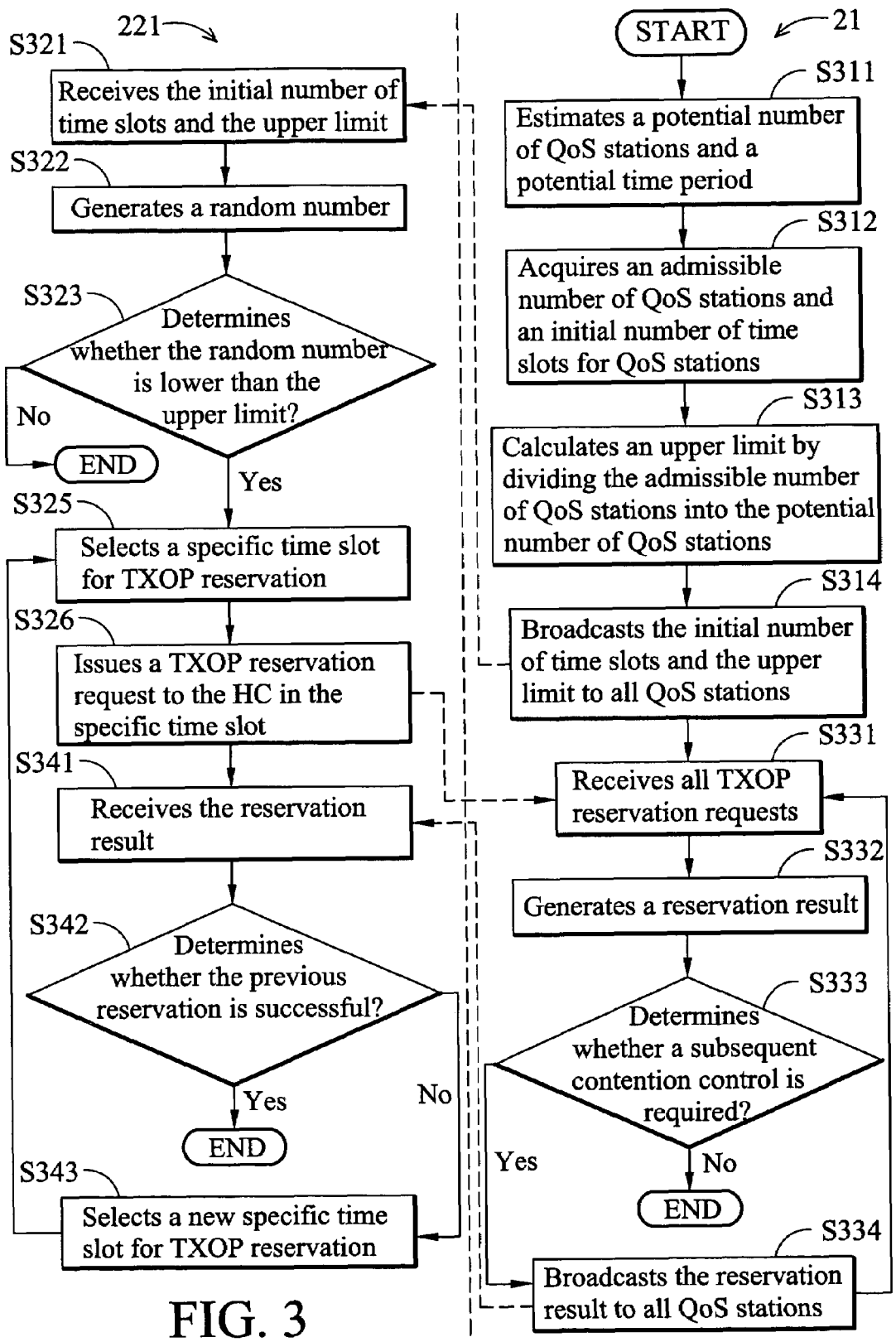
FIGS. 3 is a flowchart showing a method of contention control according to the preferred embodiment of the invention.

The invention additionally discloses a storage medium storing a computer program providing the disclosed method of contention control in a QSTA, as shown in FIGS. 3. The computer program product includes a storage medium 60 having computer readable program code embodied therein for use in a QSTA, the computer readable program code comprising at least computer readable program code 621 receiving an initial number of time slots and an upper limit, computer readable program code 622 generating a random number between 0 and 1, computer readable program code 623 determining whether the random number is lower than the upper limit, computer readable program code 624 selecting a specific time slot for data transmission contention, computer readable program code 625 issuing a TXOP reservation request to a QAP in a specific time slot, computer readable program code 626 receiving a reservation result from the QAP and computer readable program code 627 determining whether the previous reservation is successful by checking the reservation amount in the previously reserved time slot.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for contention control in a wireless network comprising a Quality-of-Service (QoS)-enabled access point (QAP) and a plurality of Quality-of-Service-enabled stations (QSTA), comprising:
    the QAP broadcasting an initial number of time slots and an upper limit to the QSTAs;
    the QSTAs each generating a random number between 0 and 1; and
    choosing the QSTAs having a random number lower than the upper limit to be contenders;
    the contenders along with the QAP recursively performing a contention process within a potential time period, wherein the potential time period satisfies a confidence level of QoS according to experiment data, and the contention process comprising:
    the contenders each selecting a time slot from the initial number of time slots and issuing a transmission opportunity (TXOP) reservation request to the QAP in the time slot;
    the QAP collecting all TXOP reservation requests to generate a reservation result recording reservation amounts of all time slots;
    during the potential time period, the QAP attaching a new number of time slot to the reservation result only if more than one contenders are collided on the same time slot;
    upon receipt of the reservation result attached with the new number of time slot, the collided contenders along with the QAP repeating the contention process to reselect new time slots; and
    concluding the contention process if all contenders successfully complete the time slot selection without collision.

2. The method as claimed in claim 1 wherein the QSTA is a mobile computer, a mobile handheld device, a smart phone, a wireless on-line gaming console, a wireless net TV or a wireless information appliance.

3. The method as claimed in claim 1 wherein the potential time period is calculated by an equation, $$\hat{T} > \mu + \frac{1}{\sqrt{1-N}} \sigma,$$

$\hat{T}$ representing the potential time period, $\mu$ representing the average of time periods according to experiment data, $\sigma$ representing the square root of the variance of time periods according to experiment data, and N representing the confidence level.

4. The method as claimed in claim 1 further comprising the steps of:
    the QAP determining a potential number of OSTAs according to historical data;
    the QAP acquiring an admissible number of OSTAs and the initial number of time slots by querying a resource management database with the potential number of QSTAs and a potential time period; and
    the QAP generating the upper limit by dividing the admissible number of QSTAs into the potential number of QSTAs.

5. The method as claimed in claim 4 wherein the potential time period is calculated by an equation, $$\hat{T} > \mu + \frac{1}{\sqrt{1-N}} \sigma,$$

$\hat{T}$ representing the potential time period, $\mu$ representing the average of time periods according to experiment data, $\sigma$ representing the square root of the variance of time periods according to experiment data, and N representing the confidence level.

6. A system for contention control in a Quality-of-Service-enabled access point (QAP), comprising:
    an initiation contention control module;
    a reservation request acquisition module, configured to receive a plurality of reservation requests during a plurality of initial time slots from a plurality of Quality-of-Service-enabled stations (QSTAs);
    a succession contention control module, configured to receive information regarding the initial time slots and the reservation requests therein from the reservation request acquisition module, generate a reservation result comprising a plurality of reservation amounts individually corresponding to one of the initial time slots, and transmit the reservation result if more than one QSTAs issued reservation requests in the same initial time slot; and
    a broadcast module, configured to receive an initial number of time slots and a upper limit from the initiation contention control module, receive the reservation result from the succession contention control module, and broadcast the initial number of time slots, the upper limit and the reservation result to the QSTAs; wherein the initiation contention control module further determines a potential number of QSTAs according to historical data, acquires an admissible number of QSTAs and the initial number of time slots by querying a resource management database with the potential number of QSTAs and a potential time period, and generates the upper limit by dividing the admissible number of QSTAs into the potential number of QSTAs, wherein the potential time period satisfies a confidence level of Quality-of-Service according to experiment data.

7. The system as claimed in claim 6 wherein the QSTA is a mobile computer, a mobile handheld device, a smart phone, a wireless on-line gaming console, a wireless net TV or a wireless information appliance.

8. The system as claimed in claim 6 wherein the potential time period is calculated by an equation, $$\hat{T} > \mu + \frac{1}{\sqrt{1-N}}\sigma,$$

$\hat{T}$ representing the potential time period, $\mu$ representing the average of time periods according to experiment data, $\sigma$ representing the square root of the variance of time periods according to experiment data, and N representing the confidence level.

9. The system as claimed in claim 6 further comprising a storage device storing the resource management database.

10. A computer readable medium in a Quality-of-Service-enable station(QSTA) storing a computer program which, when executed, performs a method for contention control, the method comprising the steps of:
receiving an initial number of time slots and an upper limit from a Quality of Service (QoS) access point (QAP);
generating a random number between 0 and 1;
participating in a contention process if the random number is lower than the upper limit, wherein contention process is performed within a potential time period, the potential time period satisfying a confidence level of QoS according to experiment data, and the contention process comprising:
selecting a time slot from the initial number of time slots and issuing a transmission opportunity (TXOP) reservation request to the QAP in the time slot;
upon receipt of a reservation result broadcasted by the QAP, determining whether collision occurs;
repeating the contention process to reselect new time slots if collision occurs; and
concluding the contention process if no collision occurs.

11. The computer readable medium as claimed in claim 10 wherein the QSTA is a mobile computer, a mobile handheld device, a smart phone, a wireless on-line gaming console, a wireless net TV or a wireless information appliance.

\* \* \* \* \*